US011388218B2

(12) United States Patent
Brand et al.

(10) Patent No.: US 11,388,218 B2
(45) Date of Patent: Jul. 12, 2022

(54) CLOUD FILE TRANSFERS USING CLOUD FILE DESCRIPTORS

(71) Applicant: CTERA Networks, Ltd., Petach-Tikva (IL)

(72) Inventors: Aron Brand, Petach-Tikva (IL); Amir Goldstein, Tel-Aviv (IL)

(73) Assignee: Ctera Networks, Ltd., Petach-Tikva (IL)

(*) Notice: Subject to any disclaimer, the term of this patent is extended or adjusted under 35 U.S.C. 154(b) by 54 days.

(21) Appl. No.: 16/368,011

(22) Filed: Mar. 28, 2019

(65) Prior Publication Data
US 2020/0314165 A1 Oct. 1, 2020

(51) Int. Cl.
H04L 67/06 (2022.01)
H04L 67/1074 (2022.01)
H04L 9/06 (2006.01)
G06F 3/06 (2006.01)
H04L 67/1097 (2022.01)
H04L 9/32 (2006.01)

(52) U.S. Cl.
CPC .............. H04L 67/06 (2013.01); G06F 3/064 (2013.01); G06F 3/067 (2013.01); G06F 3/0608 (2013.01); H04L 9/0643 (2013.01); H04L 9/3213 (2013.01); H04L 67/108 (2013.01); H04L 67/1097 (2013.01)

(58) Field of Classification Search
CPC ... H04L 67/06; H04L 67/1097; G06F 3/0608; G06F 3/064
See application file for complete search history.

(56) References Cited

U.S. PATENT DOCUMENTS

| 8,924,511 B2 | 12/2014 | Brand |
| 2003/0023618 A1* | 1/2003 | Orbits .................... G06F 16/184 |
| 2010/0138534 A1 | 6/2010 | Mutnuru et al. |
| 2013/0114502 A1 | 5/2013 | Joshi et al. |
| 2014/0040616 A1* | 2/2014 | Barber ............. H04N 21/26606 713/168 |
| 2014/0059226 A1* | 2/2014 | Messerli ............... H04L 47/783 709/226 |
| 2014/0108474 A1 | 4/2014 | David et al. |
| 2015/0261782 A1 | 9/2015 | McFerrin et al. |

(Continued)

FOREIGN PATENT DOCUMENTS

WO 2016160144 A1 10/2016

OTHER PUBLICATIONS

Muthitacharoen, et. al, "A Low-Bandwidth Network File System", ACM SIGOPS Operating Systems Review, vol. 35, No. 5, 2001.

(Continued)

Primary Examiner — Ashish Thomas
Assistant Examiner — Dustin D Eyers
(74) Attorney, Agent, or Firm — M&B IP Analysts, LLC

(57) ABSTRACT

A method and system method for reading a file from a cloud storage service are provided. The method includes receiving, from a client device, a request to read at least a portion of a file from a cloud storage service, wherein the cloud storage service is associated with at least one object storage system; and sending a cloud file descriptor to the client device, wherein the cloud file descriptor includes a plurality of download tokens utilized to retrieve objects constituting the requested at least a portion of the file from the at least one object storage system.

26 Claims, 7 Drawing Sheets

(56) References Cited

U.S. PATENT DOCUMENTS

| | | |
|---|---|---|
| 2015/0356116 A1 | 12/2015 | Lin et al. |
| 2017/0195417 A1 | 7/2017 | Brand |
| 2018/0367644 A1 | 12/2018 | Mckay et al. |
| 2020/0125656 A1 | 4/2020 | Li |

OTHER PUBLICATIONS

The Extended European Search Report for EP Patent Application No. 20163861.6 dated Jul. 1, 2020, EPO, Munich Germany.
The European Search Report for European Patent Application No. 20163872.3, dated May 18, 2020, EPO, Munich, Germany.
Muller et al., "Social Networking APIs for Companies: An Example of using the Facebook API for Companies", 2011 International Conference on Computational Aspects of Social Networks, IEEE, 2011: pp. 120-123.
Olson L et al: "Trust Negotiation as an Authorization Service forWeb Services", Data Engineering Workshops, 2006. Proceedings. 22ND International Conference On Atlanta, GA, USA Apr. 3-7, 2006, Piscataway, NJ, USA, IEEE, Apr. 3, 2006.
The Communication Pursuant to Article 94(3) EPC for European Application No. 20163872.3, European Patent Office (EPO), dated Mar. 11, 2022.

\* cited by examiner

Cloud File Descriptor
600

Upload or Download token(s)

https://bucket1.s3.amazonaws.com/blocks/3498539393?AWSAccessKeyId=AKIALGKOKBY37F5FZF4I&Signature=bPSs8Kcak&Expires=1531446995
https://bucket2.s3.amazonaws.com/blocks/3494559390?AWSAccessKeyId=1KIALGKOKBY37F5FZA4I&Signature=bPSs0Kcak&Expires=1531446995

Encryption key(s)

KKIALGKOKBY37F5FZA4IALGKOKBY37F5FZA4

FIG. 6

CLOUD FILE TRANSFERS USING CLOUD FILE DESCRIPTORS

TECHNICAL FIELD

The present disclosure relates generally to cloud storage and more specifically to transfer methods for cloud storage.

BACKGROUND

The demand for object storage has been rapidly increasing. As the amount of data (such as digital media) stored by users grows, so does the need to store digital media reliably over extended periods of time. Object storage offers superior scalability for storing numerous objects compared to traditional file-based storage systems. Furthermore, commercially available object storage systems such as Amazon Web Services (AWS®), Simple Storage Service (S3), IBM® Cloud Object Storage, Azure® Blob Storage, all offer superb ability for handling numerous concurrent clients reading and writing data over high latency WAN links.

In related art, a cloud storage service stores files in a segmented and distributed fashion, where files are split into blocks which are given unique IDs, and then each unique block is stored as objects in one or more object storage system.

In this related art, clients upload files to a cloud storage service by dividing a file to blocks, calculating a unique ID for each block, and sending the unique IDs to a cloud connector. The cloud connector determines, based on a blocks database, whether blocks with the given unique ID's are missing in the system, and replies to the client with the list of missing blocks. The client then uploads the missing blocks to the cloud storage service via the cloud connector, which stores the blocks in one or more object storage system.

This process allows one to efficiently receive and store only blocks which are not already present in the system, thus conserving storage space and network traffic. The cloud connector, being in the data path, may become a bottleneck for uploads and downloads.

This is especially true when the object storage system and the cloud connector are not co-located, and the clients may have a more direct path to the object storage system. For example, in the case where the cloud connector is located for security reasons inside a secure corporate private network while the clients as well as the object storage system are located on the Internet. In other cases, the object storage system may be replicated to multiple locations worldwide, and it is beneficial to read and write to a replica that is near the client.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a system and method for reading a file from a cloud storage service. The method comprises receiving, from a client device, a request to read at least a portion of a file from a cloud storage service, wherein the cloud storage service is associated with at least one object storage system; and sending a cloud file descriptor to the client device, wherein the cloud file descriptor includes a plurality of download tokens utilized to retrieve objects constituting the requested at least a portion of the file from the at least one object storage system.

Some embodiments disclosed herein include a system and method for writing a file to a cloud storage service. The method comprises receiving, from a client device, a request to write a file to a cloud storage service, wherein the cloud storage service is associated with at least one object storage system; sending a cloud file descriptor to the client device, wherein the cloud file descriptor includes a set of upload tokens utilized for uploading a plurality of blocks constituting the file, wherein the plurality of blocks constituting the file are stored in the at least one object storage system; and receiving a notification that upload of the plurality of blocks constituting the file to the at least one object storage system has been completed.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 6 is an example cloud file descriptor according to an embodiment.

DETAILED DESCRIPTION

Figure 1:
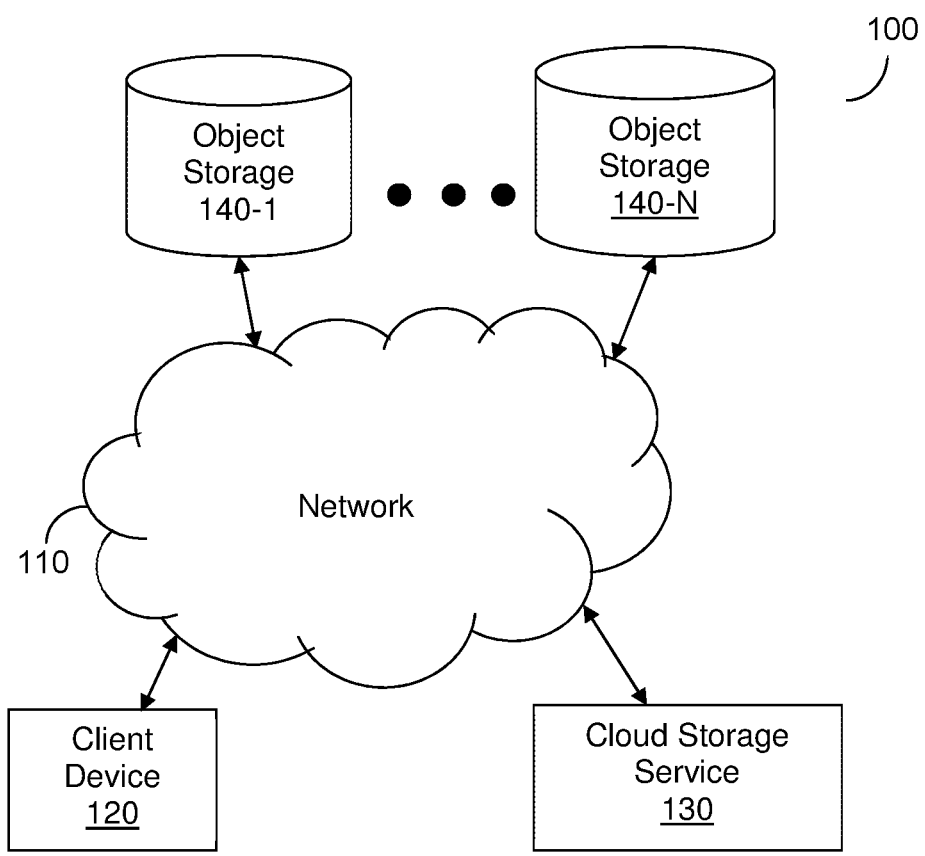
FIG. 1 shows an example network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views. Moreover, steps which are listed in sequential fashion may and often are preferably performed in parallel. Further, the term "object" may be used interchangeably with the term "file".

FIG. 1 shows an example network diagram 100 utilized to describe the various disclosed embodiments. In the example network diagram 100, a client device 120, a cloud storage service "CSS" 130, and at least one object storage system 140 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The client device 120 may be a user's personal device such as, but not limited to, a personal computer, a laptop, a tablet computer, a smartphone, a wearable computing device, and the like. In other embodiments, the client device 120 may be a storage appliance, such as a storage gateway, a cache storage appliance, and the like. The various embodiments disclosed herein can be performed by the client device 120. In one implementation, the client device 120 may include a software agent configured to perform the processes disclosed herein. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The CSS 130 is configured to communicate with the client device 120 as well as the object storage systems 140. The CSS 130 may provide one or more services to the client device 120 including managing reads and writes to the object storage systems 140. The CSS 130 may also provide one or more services including managing file descriptors. The CSS 130 may be implemented as one or more physical entities or as one or more virtual entities executed over a server. A virtual entity may include a virtual machine, a software container, a micro-service, a distributed cluster, and the like. An example implementation of the cloud storage service is discussed below with reference to FIG. 7.

In an embodiment, a cloud file descriptor may be used for reading files directly from one or more object storage systems 140, as well as for writing files to the one or more object storages 140, without a cloud connector in the data path. A cloud file descriptor may be obtained by a user having sufficient privileges from a file descriptor service on CSS 130. The file descriptor may be created in read mode, or in write mode.

A cloud file descriptor in read mode may include a collection of download tokens that may be used to retrieve the objects that constitute the file or a subset of a file, from the one or more object storage systems 140. The cloud file descriptor may contain all the needed information in order to access the object storage systems, retrieve the objects without needing to perform further authentication, by means of a token that can be verified by the object storage systems 140.

In an embodiment, the blocks constituting a file may be dispersed between two or more of the object storage systems 140. In this embodiment, the cloud file descriptor contains all the information needed in order to allow the client device to connect 120, for each block, to the object storage system 140 in which the block is stored, for example, by including a full uniform resource locator (URL) for downloading the object.

In an embodiment, multiple replicas of the same block may be stored in different object storage systems 140. In this embodiment, one of the object storage systems 140 from which to download a replicated block is selected. In one implementation, the selection of which of the object storage systems block to download from may be based on proximity of each of the object storage systems 140 to the client device, a current load of each of the object storage systems 140, a combination thereof, and the like. In yet another embodiment, the cloud file descriptor may include several alternative sources from which to download the block.

In another embodiment, a cloud file descriptor in the write mode may include a collection of upload tokens that can be used to upload the objects that constitute the file or a subset of a file, to the one or more object storage systems at the discretion of the receiving cloud storage service. The cloud file descriptor may contain all the needed information in order to access the object storage systems 140, write the objects without needing to perform further authentication, by means of a token that can be verified by the object storage system. It should be noted that the cloud file descriptor may include upload tokens to different object storage systems 140 when the blocks of a files dispersed between a plurality object storage systems 140.

In some embodiments, the cloud storage service may select the placement each block in the object storage system. The placement may be randomly or based on placement criteria. Examples for placement criteria include proximity of the object storage system 140 to the client device 120, remaining capacity of the object storage system 120, momentary system load of each object storage system 140, combinations thereof, and the like.

The placement criteria can also take into consideration regulatory requirements, for example, if there is a legal requirement to place a specific file in a certain geographic region, the cloud storage service may instruct the client device 120 to upload the blocks of that files to an object storage system 140 in that region. The placement policy may also take into consideration a classification of the file being stored in order to determine the most suitable placement.

In an embodiment, the upload and download tokens may be encoded as signed URLs (uniform resource locators) which incorporate a signature that is used as a credential to perform an action on the object storage system, such as those supported by the AWS S3 object storage application programming interface (API). Furthermore, in an embodiment, the signed URLs have a limited validity duration after which they expire. For continued access, the client must request a new cloud file descriptor that is valid for an extended period.

In an embodiment, the cloud file descriptor also includes one or more encryption keys used to encrypt or decrypt the objects prior to storing or after reading them from the object storage system. Such an embodiment is especially beneficial if the object storage system is to be considered in a less secure zone than the cloud storage service, and it is desired that administrators of this system are not able to decipher any of the stored data.

In an embodiment, the CSS 130 may utilize a block database or other form of index of the block identifiers (IDs) in order to track which blocks exists in the system and to track the mapping between the unique block ID and its storage location (which may be encoded as a URL). The CSS 130 may be on a different system or location as the object storage system 140. Similarly, CSS 130 may be on the same system or at the same location as the object storage system 140.

Figure 2:
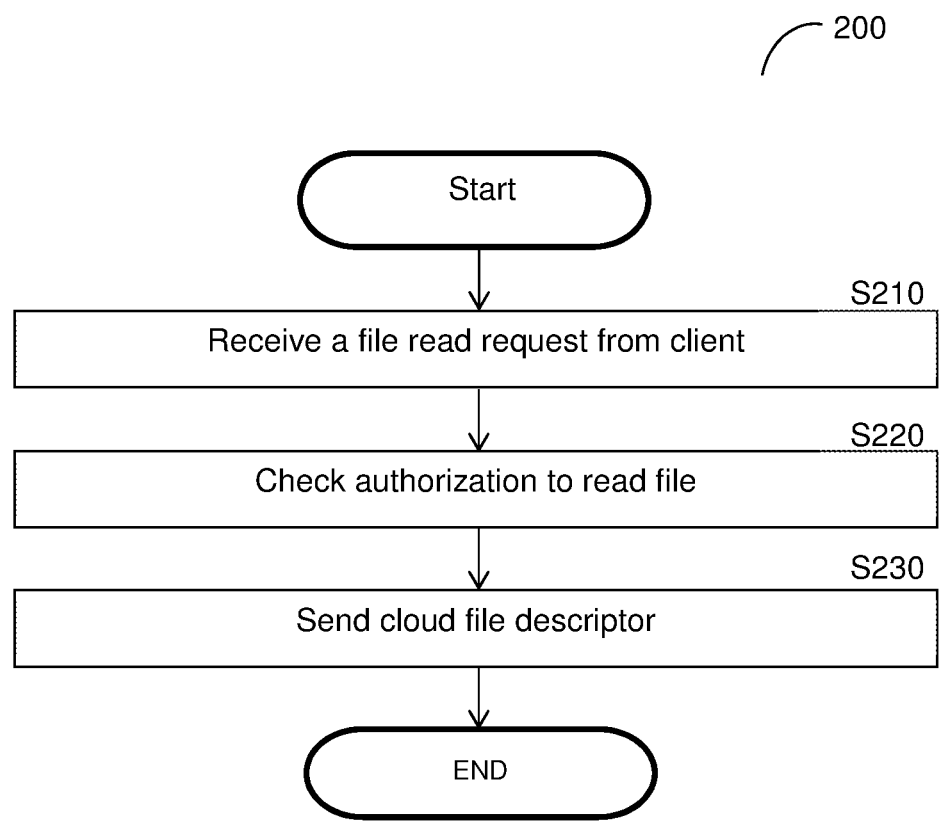
FIG. 2 is an example flowchart illustrating a method for reading a file from an object storage system a cloud storage service according to an embodiment.

FIG. 2 is an example flowchart 200 illustrating a file read process using a cloud storage service according to an embodiment. The method may be performed by the CSS 130 depicted in FIG. 1.

At S210, a read request to open a file for reading is received. The path of the file may be transmitted along with the read request. In an embodiment, the read request is received from the client device (e.g., the client device 120, FIG. 1). The read request may be for reading a portion of a file. In an embodiment, the portion of a file may be, for example, specified as a set of offsets or byte ranges within the files. In another embodiment, the portion of a file may be defined by content, for example, as a set of block IDs to retrieve.

In an embodiment, a user of the client device authenticates to the cloud storage service before sending the read request. In response to a successful authentication, the cloud storage service may return tokens serving as temporary credentials for reading or writing objects in the object storage system. In a further embodiment, the user does not authenticate to the object storage systems.

At S220, a check is made to determine if the client device is authorized to read the file. To this aim, permissions in one or more access lists locally for each file or folder can be compared to determine whether the client device has the appropriate permissions.

At S230, upon determining that the client device is authorized, a cloud file descriptor is sent to the client device. The cloud file descriptor in read mode may be a collection of download tokens that may be used to retrieve the objects that constitute the file or portion thereof, from one or more of the object storage systems 140, FIG. 1. In an embodiment, the cloud file descriptor also includes at least one decryption key.

The client device may use the cloud file descriptor in order to fetch the needed data from the one or more object storage systems, typically over the hypertext transfer protocol secure (HTTPS), and then use the decryption keys in order to decipher the data. The client device may fetch all the objects in order to reconstruct the entire file, or fetch only some objects, or specific byte ranges of some objects, in order to allow a partial file read.

In an embodiment, the client device may maintain a local blocks database. The local blocks database includes a mapping of block IDs to locations of data on a local storage system. In such case, the client device may satisfy specific read requests by reading them locally without having to request those blocks from an object storage system. A process to read a file, as performed by the user device, is further discussed with reference to FIG. 5.

Figure 3:
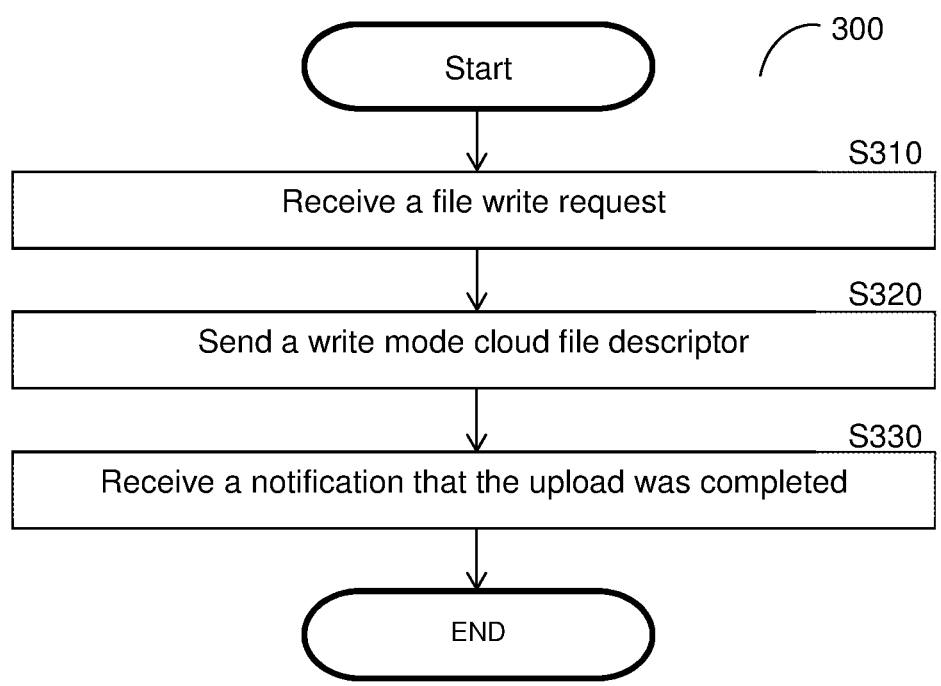
FIG. 3 is an example flowchart illustrating a method for writing to an object storage system a file using a cloud storage service according to an embodiment.

FIG. 3 is an example flowchart 300 illustrating a method for writing a file to a cloud storage service associated with an object storage system according to an embodiment. The method may be performed by the CSS 130 depicted in FIG. 1.

At S310, a request to open a file for write is received. The request includes a path of the file and a list of block IDs. The request may be sent, for example, by the client device 120, FIG. 1. In an embodiment, a user of the client device authenticates to the cloud storage service before sending the request. In response to a successful authentication, the cloud storage service may return tokens serving as temporary credentials for writing objects in object storage systems such as the object storage systems 140, FIG. 1. The user is not required to authenticate to the object storage systems.

At S320, in response to the received request, a cloud file descriptor in the write mode is sent to the client device. In an embodiment, the write mode cloud file descriptor includes a collection of upload tokens that can be used to upload blocks (the blocks constituting the file or a portion of a file) to the object storage system(s). In an embodiment, encryption keys are also sent to the client device as part of the cloud file descriptor. The client device may use the encryption keys to encrypt the blocks, while uploading them to one or more object storage systems by utilizing the signed URLs. The cloud file descriptor may contain all the information needed in order to access the object storage systems and to write the objects without needing to perform further authentication, by means of a token that can be verified by the object storage systems. As discussed above, if more than one CSS is available, the desired placement of each block to the corresponding object storage system is determined and included in the write mode cloud file descriptor.

In an embodiment, S320 further includes determining, based on a block database (not shown), whether blocks with the given unique ID's are missing in the object storage system. In such cases, S320 may include replying to the client device with tokens for uploading only the missing blocks while omitting the blocks which are already present in the object storage system (e.g., the object storage system 140).

At S330, a notification about completion of the upload of some or all of the blocks constituting the file to the object storage system is received. The block database may be a relational database, a non-relational database, a key-value store, a cloud database, an in-memory database, or any other form of index that allows determining whether a set of given block IDs is already present in the system.

Responsive to the received notification, the blocks are registered in the block database and the file is registered as available in a files directory. The files directory may be a relational database, a non-relational database, a key-value store, a cloud database, an in-memory database, a set of objects representing directories in an object storage, a traditional filesystem (e.g., XFS), a parallel filesystem, or any other persistent storage system.

In an embodiment, the notification is sent by the client device. In another embodiment, the object storage system provides notifications upon upload completions, which the CSS uses to determine when the upload has completed. In yet another embodiment, the client device sends a notification for completion of the storing of each block, which is used to determine when the upload has completed. A process for writing a file, as performed by the client device, is further discussed with reference to FIG. 4.

Figure 4:
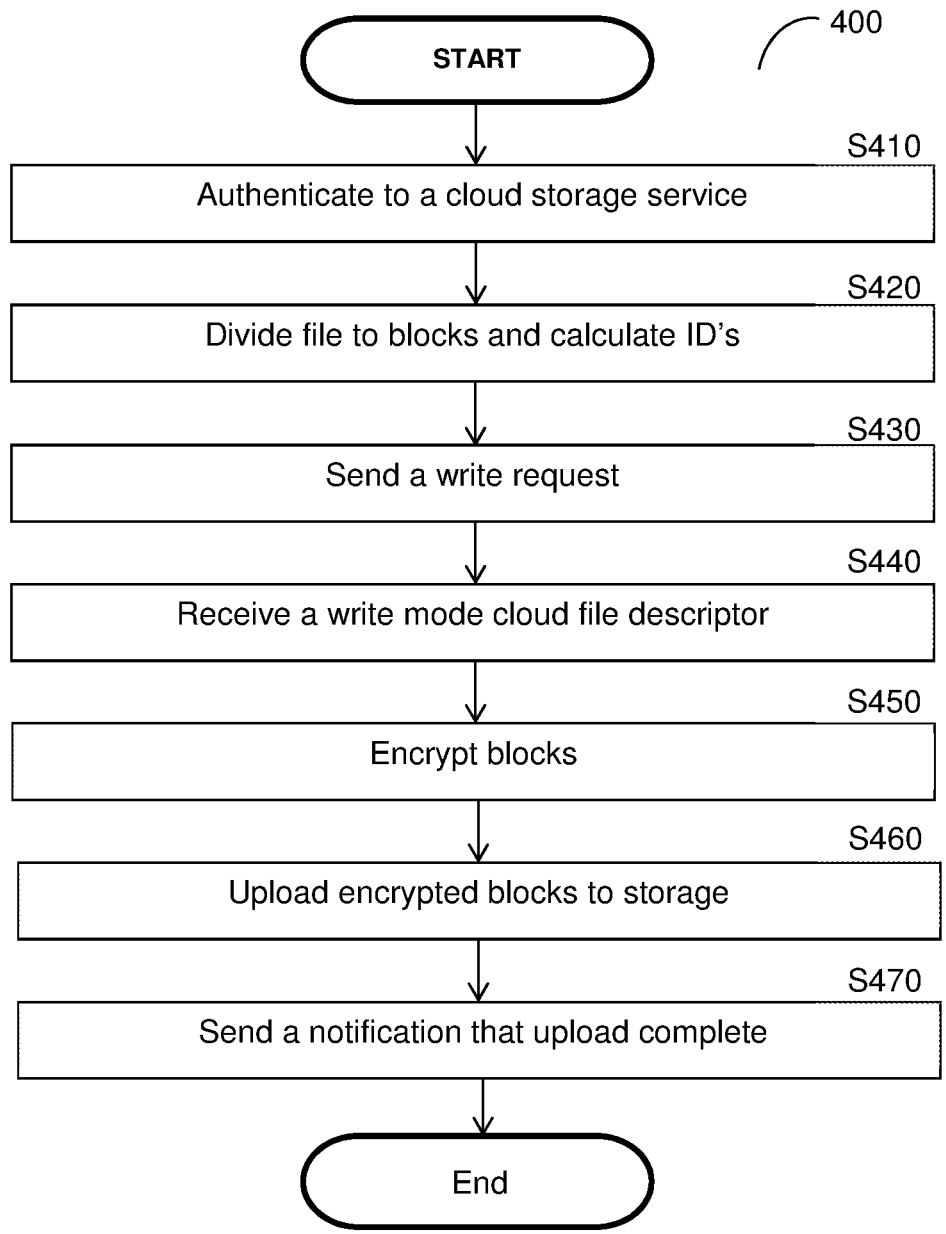
FIG. 4 is an example flowchart illustrating a method for writing a file to an object storage system using a cloud storage service as performed by a client device according to an embodiment.

FIG. 4 is an example flowchart 400 illustrating a method for writing a file to a cloud storage service according to an embodiment. The method may be performed by the client device 120 depicted in FIG. 1. At S410, an authentication to a cloud storage service is performed.

At S420, a file to be written or portion thereof is divided into blocks and a unique block identifier (ID) is computed for each block. In some embodiments, the unique block IDs are computed using a hash function (for example, a HMAC-SHA-256 hash function). The dividing of the file to blocks may be based on a fixed block size or a variable block size. For example, a variable size shift-resistant blocks scheme may be based on Rabin fingerprints.

At S430, a request to open the file for write is sent. As noted above, the request includes the path of the file and the list of block IDs.

At S440, a cloud file descriptor in write mode including a list of signed URLs and encryption keys is received.

At S450, the blocks to be written are encrypted by the encryption keys to encrypt. At S460, the encrypted blocks are uploaded to the object storage systems. The uploads are through the signed URLs included in the cloud file descriptor. Typically, many blocks are uploaded in parallel in order to minimize effects of network latency.

At S470, upon completion of the uploads, a notification indicating such completion of the upload is sent.

In an embodiment, the CSS stores, in persistent storage, a reference to the metadata of the file. The reference may include, but is not limited to, the name of the file, the path of the file, and the list of locations of blocks needed to reconstruct the file. In some embodiments, portions of the metadata are stored in an object storage system (e.g., one of the object storage systems 140).

In some embodiments, a verification step to check whether or not writes actually took place is performed. This may also include checking that the written data matches the unique ID that was provided by the file. In an embodiment, the reading of the object from the object storage system is verified by calculating its unique ID and comparing this unique ID with the value provided by the client device. In this embodiment, all the blocks of a file may be verified before accepting the file. In another embodiment, calculating of the unique ID independently of the client device for verification purposes may be performed by a serverless function, also known as function as a service (FaaS) triggered by uploading of the object to the object storage. Examples for providers of serverless functions include AWS® Lambda®, Azure® Functions, and Google® Cloud-Functions.

In another embodiment, an object storage system (e.g., one of the object storage systems 140) may provide a proof of upload signature to the client device, as a response to each write. The client device may provide this proof of upload signature to the cloud connector, which verifies the proof of upload signature. This removes the need for the CSS to read the block back and to calculate its unique ID.

In another embodiment, the CSS or object storage system may include a file access service utilizing a common storage protocol such as WebDAV, SMB, NFS or Amazon Web Service (AWS) S3. Such file access service may allow, among other operation types, reading and writing files. In an embodiment, the file access service may include a load balancer, a plurality of application servers, or both, providing the ability to read or write a file. Upon an authenticated user requesting a download operation, the file access service requests a cloud file descriptor in a read mode on behalf of the user from the CSS. The file access service may then work directly with the one or more object storage systems to read the objects and provide their contents to a device file access service using the storage protocol.

Similarly, upon an authenticated user requesting an upload operation, in the write mode, the client device provides the block IDs of blocks to be uploaded. In an embodiment, the file access service may buffer a portion of the received content, calculate the block IDs, obtain a partial cloud file descriptor, and write the data to the object storage system. This is performed iteratively until the file is written completely. Then, the file access service may communicate directly with the one or more object storage systems to write the blocks comprising the portion of the file from the buffer to the object storage systems, and continue this process of buffering parts of the uploaded file received from the client and storing corresponding blocks to the object storage systems until the entire file is uploaded. In an embodiment, the file access service may use auto-scaling, adding and removing application servers based upon demand.

In an embodiment, the file access service, particularly for certain stateless file access protocols such as WebDAV, may be built as a set of serverless functions. This allows the service to scale on demand automatically and eliminates server maintenance. In an embodiment, the file access service encrypts and decrypts the data on behalf of the client.

While the file access service may be beneficial to provide compatibility with common file access protocols, the CSS may also provide a direct access SDK or API that allows software developers to request cloud file descriptors in order to directly read and write files from the CSS by communicating directly with the object storage systems, without requiring data to pass through the file access service.

In an embodiment, the file transfer protocol may allow storing open files which may change during the transfer.

In yet another embodiment, utilizing a file level clone, a snapshot, or atomic read functionality offered by the operating system or file system may be used in order to achieve a consistent view of the file during its transfer.

In yet another embodiment, uploading of each block may be attempted using the cloud file descriptor to allow sending open files with the file transfer protocol. The block unique ID may be recalculated in parallel to the upload. Prior to sending the last bytes of the block to the object storage systems, the block unique ID may finish calculating, and compare that to the original unique ID. When the values do not match, the block storage operation may be aborted. In an embodiment, the file transfer or the transfer of specific blocks of the file may be retried.

In yet another embodiment, one of the above options may be selected at runtime using a heuristic based on the estimated probability of the file to change during the upload. For example, the probability of the file to change may be estimated using: a file last modification timestamp; the file size(s); an upload throughput; a file modifications history log; results of previous attempts to upload blocks of the file; or a combination thereof.

Figure 5:
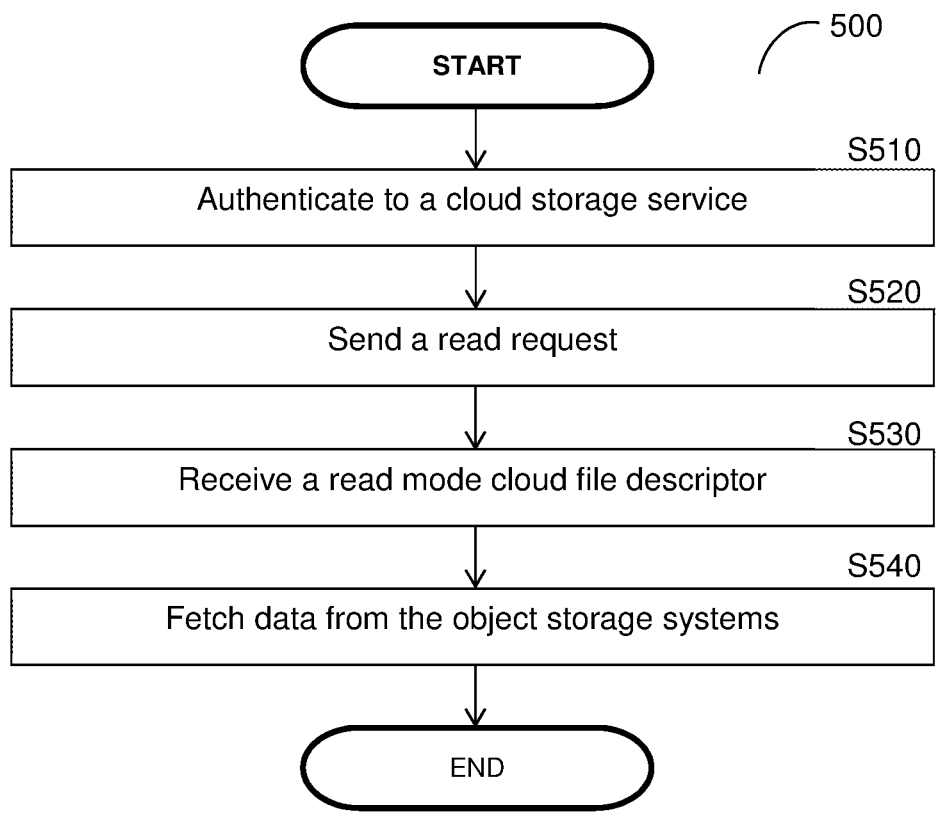
FIG. 5 is an example flowchart illustrating a method for reading a file from an object storage system using a cloud storage service as performed by a client device according to an embodiment.

FIG. 5 is an example flowchart 500 illustrating a method for reading a file using a cloud storage service according to an embodiment. In an embodiment, the method is performed by a client device, e.g., the client device 120 of FIG. 1.

At S510, an authentication to the cloud storage service is performed. At S520, upon successful authentication, a request to open a file for reading is sent. The request may include a path of the file to be read.

At S530, a cloud file descriptor including a list of signed URLs and decryption keys are received. The file descriptor is sent to the client device when it is determined that the user device is authorized to access the request file.

At S540, using the cloud file descriptor, the data of the requested file is fetched from the one or more object storage systems. The data may be fetched over the HTTPS protocol, and the decryption keys may be utilized in order to decipher the data. The All of the objects may be fetched in order to reconstruct the entire file, or only some objects may be fetched or specific byte ranges of some objects may be fetched in order to allow a partial file read.

In an embodiment, the client device may maintain a local blocks database, mapping block IDs to locations of data on a local storage system. In such case, the client device may satisfy specific read requests by reading them locally, without having to request those blocks from an object storage system.

The client device may be a personal user device or a storage appliance. A storage appliance may be a storage appliance, such a storage gateway, a cache storage appliance, and the like. The personal user device may be a smartphone, a laptop computer, and the like. In such configuration, an agent is installed on the client device.

FIG. 6 is an example illustration of a cloud file descriptor 600 according to an embodiment. In some embodiments, the cloud file descriptor 600 may include one or more upload tokens. For example, the upload token(s) may be encoded as signed URLs. Similarly, the cloud file descriptor 600 may include one or more download tokens. The download tokens may also be encoded as signed URLs. The upload and download tokens may be time limited and have an expiration date and time. After the expiration date and time, the token is considered invalid by the object storage system. Upon recognizing that a token is invalid, the client device may request a new cloud file descriptor containing new tokens having an extended expiration date. Additionally, the cloud file descriptor 600 may include one or more encryption keys. A single cloud file descriptor may contain tokens for multiple object storage systems. A cloud file descriptor may represent a full file or a portion of a file.

Figure 7:
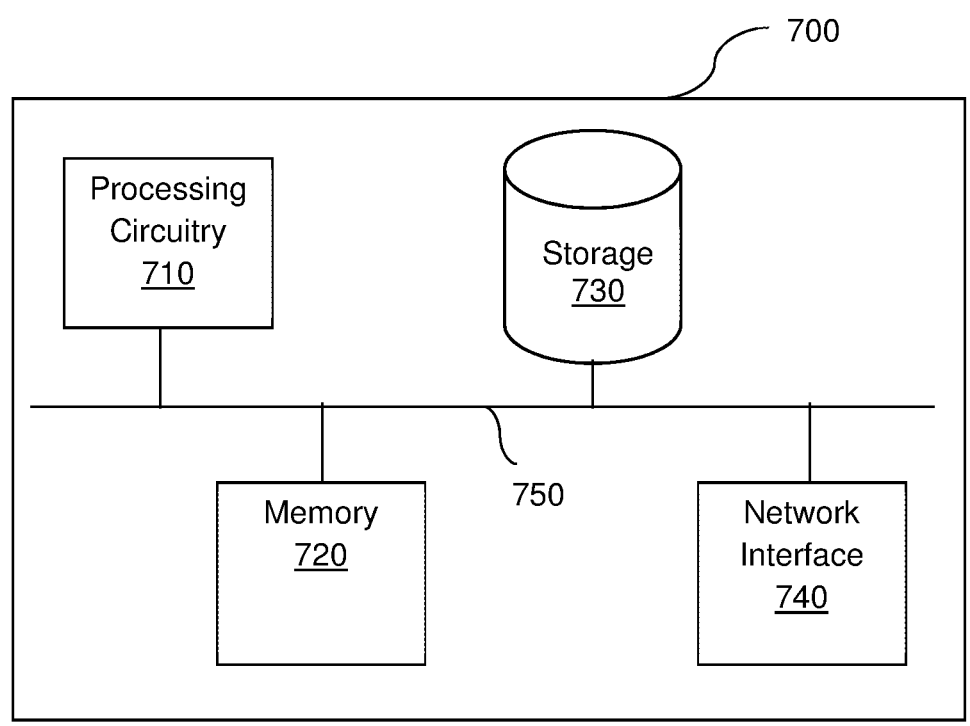
FIG. 7 is an example schematic diagram of a system implementing the cloud storage service according to an embodiment.

FIG. 7 is an example schematic diagram of a system 700 implementing the CSS 130 implemented according to an embodiment. The CSS 130 includes a processing circuitry 710 coupled to a memory 720, a storage 730, and a network interface 740. In an embodiment, the components of the CSS 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 720 may be volatile (e.g., RAM, etc.), non-volatile (e.g., ROM, flash memory, etc.), or a combination thereof. In one configuration, computer readable instructions to implement one or more embodiments disclosed herein may be stored in the storage 730.

In another embodiment, the memory 720 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein. Specifically, the instructions, when executed, cause the processing circuitry 710 to create, generate and manage direct to cloud file transfers as described herein using cloud file descriptors.

The storage 730 may be magnetic storage, optical storage, and the like, and may be realized, for example, as flash memory or other memory technology, CD-ROM, Digital Versatile Disks (DVDs), or any other medium which can be used to store the desired information.

The network interface 740 allows the CSS 130 to communicate with the client device 120 and the object storage systems 140 for the purpose of, for example, receiving data, sending data and files, and the like.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:
1. A method for reading a file through use of a cloud storage service, comprising:
receiving by the cloud storage service, from a client device, a request to read at least a portion of a file, wherein the cloud storage service is associated with at least one object storage system; and sending a cloud file descriptor from the cloud storage service to the client device, wherein the cloud file descriptor includes a plurality of download tokens utilizable by the client device to retrieve objects constituting the requested at least a portion of the file from the at least one object storage system, wherein the plurality of download tokens each includes at least an indicator of the location of the object and at least one temporary credential, wherein the at least an indicator of the location of the object and the at least one temporary credential are for use by the client device to retrieve the at least a portion of the file from the at least one object storage system without requiring any other authentication of the client device to the at least one object storage system.

2. The method of claim 1, wherein the request to read the at least a portion of the file includes a set of block identifiers (IDs) identifying the requested at least a portion of the file, wherein each block ID is computed using a hash function over contents of the respective block.

3. The method of claim 1, wherein the at least an indicator of the location of the object is at least a uniform resource locator.

4. The method of claim 1, wherein the cloud file descriptor further includes at least one decryption key for deciphering the retrieved objects at the client device.

5. A non-transitory computer readable medium having stored thereon instructions for causing a processing circuitry to execute the process of claim 1.

6. A method for writing a file through use of a cloud storage service, comprising:
receiving by the cloud storage service, from a client device, a request to write a file to a cloud storage service, wherein the cloud storage service is associated with at least one object storage system; and
sending a cloud file descriptor from the cloud storage service to the client device, wherein the cloud file descriptor includes a set of upload tokens utilizable by the client device for uploading a plurality of blocks constituting the file, wherein the plurality of blocks constituting the file are to be stored in the at least one object storage system, and wherein each of the upload tokens includes at least one temporary credential and an indicator of a location to store at least one of the plurality of blocks of the file in the at least one object storage system;
receiving by the cloud storage service from the client device a notification that upload of the plurality of blocks constituting the file to the at least one object storage system has been validly completed; and
accepting the file into the cloud storage system after receipt of the notification.

7. The method of claim 6, wherein the received request includes a path of the file and a list of block identifiers (IDs) of the plurality of blocks constituting the file.

8. The method of claim 7, wherein each block ID is computed using a hash function over the contents of one of the plurality of blocks constituting the file.

9. The method of claim 7, further comprising:
saving, in a block database, the block IDs of all of the uploaded plurality of blocks constituting the file when the notification is received.

10. The method of claim 7, further comprising:
checking, for each block ID, whether a respective block exists in the cloud storage service; and adding to the set of upload tokens an upload token only for each block ID having a respective block that is not in the cloud storage service.

11. The method of claim 6, wherein each upload token includes at least a uniform resource locator (URL) utilized for storing the plurality of blocks in the at least one object storage system.

12. The method of claim 6, wherein the cloud file descriptor further includes at least one encryption key for encrypting the uploaded plurality of blocks.

13. The method of claim 6, wherein the notification includes a proof of upload signature and wherein accepting the file into the cloud storage system is after verification of the proof of upload signature.

14. A non-transitory computer readable medium having stored thereon instructions for causing a processing circuitry to execute the process of claim 6.

15. A cloud storage service, comprising:
a processing circuitry; and
a memory, the memory containing instructions that, when executed by the processing circuitry, configure the cloud storage service to:
receive, from a client device, a request to read at least a portion of a file from a cloud storage service, wherein the cloud storage service is associated with at least one object storage system;
send a cloud file descriptor to the client device, wherein the cloud file descriptor includes a plurality of download tokens utilizable by the client device to retrieve objects constituting the requested at least a portion of the file from the at least one object storage system;
wherein each of the plurality of download tokens includes at least an indicator of the location of the object and at least one temporary credential, wherein the at least an indicator of the location of the object and the at least one temporary credential are for use by the client device to retrieve the at least a portion of the file from the at least one object storage system without requiring any other authentication of the client device to the at least one object storage system.

16. The system of claim 15, wherein the request to read the at least a portion of the file includes a set of block identifiers (IDs) identifying the requested at least a portion of the file, wherein each block ID is computed using a hash function over contents of the respective block.

17. The system of claim 15, wherein the at least an indicator of the location of the object is at least a uniform resource locator (URL).

18. The system of claim 15, wherein the cloud file descriptor further includes at least one decryption key for deciphering the retrieved objects at the client device.

19. A cloud storage service, comprising:
a processing circuitry; and
a memory, the memory containing instructions that, when executed by the processing circuitry, configure the cloud storage service to:
receive, from a client device, a request to write a file to a cloud storage service, wherein the cloud storage service is associated with at least one object storage system; and
send a cloud file descriptor from the cloud storage service to the client device, wherein the cloud file descriptor includes a set of upload tokens utilizable by the client device for uploading a plurality of blocks constituting the file, wherein the plurality of blocks constituting the file are to be stored in the at least one object storage system, and wherein each of the upload tokens includes at least one temporary credential and an indicator of a location to store at least one of the plurality of blocks of the file in the at least one object storage system;

wherein the instructions, when executed by the processing circuitry, further configure the cloud storage service to:

receive from the client device a notification that upload of the plurality of blocks constituting the file to the at least one object storage system has been validly completed; and accept the file into the cloud storage system after receipt of the notification.

20. The system of claim 19, wherein the received request includes a path of the file and a list of block identifiers (IDs) of the plurality of blocks constituting the file.

21. The system of claim 20, wherein each block ID is computed using a hash function over the contents of one of the plurality of blocks constituting the file.

22. The system of claim 20, wherein the system is further configured to:

save, in a block database, the block IDs of all of the uploaded plurality of blocks constituting the file when the notification is received.

23. The system of claim 20, wherein the system is further configured to:

check, for each block ID, whether a respective block exists in the cloud storage service; and add to the set of upload tokens an upload token only for each block ID having a respective block that is not in the cloud storage service.

24. The system of claim 19, wherein each upload token includes at least a uniform resource locator (URL) utilized for storing the plurality of blocks in the at least one object storage system.

25. The system of claim 19, wherein the cloud file descriptor further includes at least one encryption key for encrypting the uploaded plurality of blocks.

26. The system of claim 19, wherein the notification includes a proof of upload signature and wherein accepting the file into the cloud storage system is after verification of the proof of upload signature.

* * * * *